UNITED STATES PATENT OFFICE.

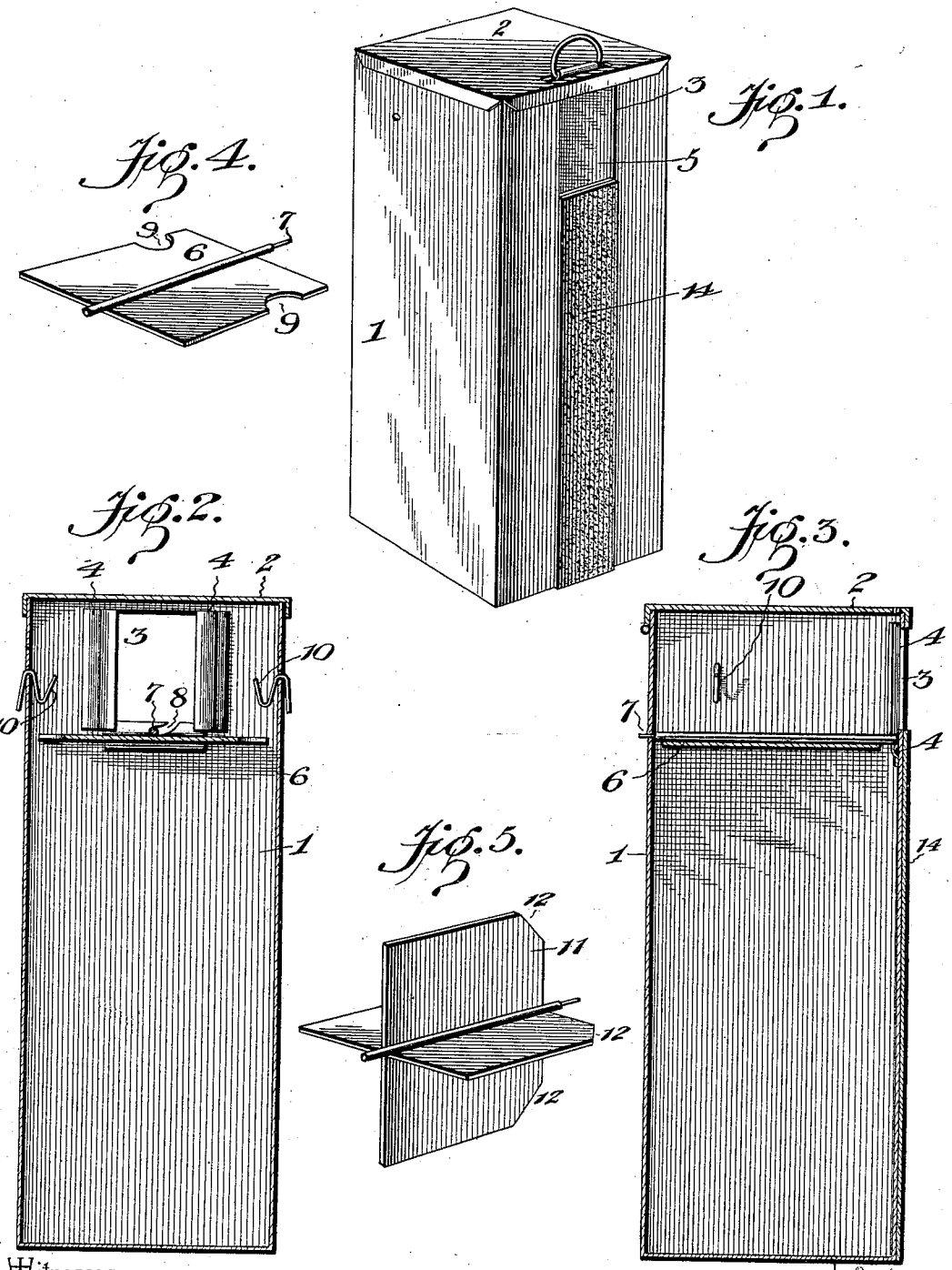

HEINRICH FRIEDRICH MARIUS LAHANN, OF TRAVER, CALIFORNIA, ASSIGNOR OF ONE-HALF TO JOSEPH ROEMER, OF VISALIA, CALIFORNIA.

COMBINED GROCERY-CAN AND SELF-SETTING ANIMAL-TRAP.

SPECIFICATION forming part of Letters Patent No. 616,119, dated December 20, 1898.

Application filed March 22, 1898. Serial No. 674,790. (No model.)

*To all whom it may concern:*

Be it known that I, HEINRICH FRIEDRICH MARIUS LAHANN, a citizen of the United States, residing at Traver, in the county of Tulare and State of California, have invented a new and useful Combined Grocery-Can and Self-Setting Animal-Trap, of which the following is a specification.

The invention relates to improvements in animal-traps.

One object of the present invention is to improve the construction of animal-traps and to provide a simple, inexpensive, and efficient one adapted to reset itself after each capture, so that it will always be set for catching an animal.

A further object of the invention is to provide an animal-trap of this class which will be capable of killing its victims as they are captured.

Another object of the invention is to enable the body of a trap to serve as a package or receptacle for goods, so that purchasers of the goods will be provided with an animal-trap after the package has been emptied of its contents, the trap being designed in such instances to serve as an inducement to purchase merchandise.

The invention consists in the construction and novel combination and arrangement of parts hereinafter fully described, illustrated in the accompanying drawings, and pointed out in the claims hereto appended.

In the drawings, Figure 1 is a perspective view of the combined merchandise-receptacle and trap constructed in accordance with this invention. Fig. 2 is a vertical sectional view taken transversely of the pivot or shaft of the trap-door, the parts being arranged to form a trap. Fig. 3 is a vertical sectional view taken at right angles to Fig. 2. Fig. 4 is a detail perspective view of the trap-door. Fig. 5 is a similar view showing a modification of the trap-door.

Like numerals of reference designate corresponding parts in all the figures of the drawings.

1 designates a can or receptacle provided with a cover or lid 2 and forming the body of the trap and designed to contain various kinds of merchandise, the trap being in the nature of an inducement to purchase the goods contained in it. The body of the trap, which is designed in use to be covered with advertising matter similar to an ordinary package, is provided at its front near its top with an entrance-opening 3 and has ways 4 at the inner face of the front wall to receive a slide 5, which closes the entrance to the trap when the body is used as a receptacle for merchandise. In emptying the merchandise the slide may be removed to permit the contents of the body or receptacle to be discharged through the entrance-opening as it is required; but of course the contents may be emptied at once by opening the lid or cover 2.

A horizontal trap-door 6 is arranged within the upper portion of the body or receptacle at the bottom of the entrance-opening and is balanced on a horizontal shaft or pivot 7, which is journaled in a perforation of the rear wall of the receptacle and in a bearing-slot 8 at the front wall thereof, and the said bearing-slot 8 is preferably provided with a horizontal branch or portion, as shown, to prevent a captured animal from dislodging the trap-door by upward pressure. The rear end of the shaft or pivot is reduced to form a shoulder to prevent the trap-door from moving rearward, and the front wall of the body of the receptacle will hold the trap-door against forward movement, as clearly shown in Fig. 3 of the accompanying drawings. By this construction there is no liability of the trap-door becoming accidentally disengaged from its bearings and falling into the receptacle. The trap-door is provided at its side edges with recesses 9, located adjacent to bait-receiving hooks 10 and adapted to enable the trap-door to clear the bait, so that it will rotate freely and cause the animal entering the trap to be precipitated into the body or receptacle.

The bait-hooks, which are detachably mounted in perforations of the side walls of the receptacle or body, may be soldered to the same or otherwise permanently mounted thereon, and they may also be arranged at the rear wall of the receptacle or body when the trap-door 11 is used. The trap-door 11 is provided with four blades instead of two, and the blades, which may vary in number, are cut away at their rear corners, as shown at 12, in order to enable the trap-door to clear the bait in rotating.

Receptacles of various sizes may be employed, either round, square, or other shape, and the covers or lids may be either stationary or removable, as desired.

Traps may be constructed for catching various kinds of animals—such as mice, rats, squirrels, and the like—and the body or receptacle is designed to be partially filled with water, so as to drown the victims.

The front of the trap is provided with a strip 14 of cloth or other suitable material to enable mice or rats to ascend readily to the entrance-opening; but when the trap is employed for squirrels and various other animals it is designed to be partially embedded in the ground to bring the entrance-opening on a level with the same, so that animals may readily enter the trap.

The invention has the following advantages: The trap, which is simple and comparatively inexpensive in construction, is positive and reliable in operation, and it is adapted to reset itself after each capture, so that it is always set. As the body of the trap is adapted to contain a quantity of water for drowning the captured animals, the latter are killed as soon as caught. The body of the trap may also be used as a receptacle or package for various kinds of merchandise, so that the trap will operate as an inducement to purchase the goods contained within it.

Changes in the form, proportion, and minor details of construction may be resorted to without departing from the spirit or sacrificing any of the advantages of this invention.

What I claim is—

1. A trap comprising a body or receptacle having an entrance-opening and provided at one side with a bearing-perforation and at the opposite side with a bearing-recess having a horizontal branch, a trap-door detachably journaled in the perforation and the recess and located at the bottom of the entrance-opening, and a bait-support arranged within the body or receptacle and located above the trap-door, substantially as described.

2. A combined grocery-can and trap comprising a body or receptacle adapted to contain merchandise and provided with an entrance-opening and having bearings arranged at the bottom of the opening, ways arranged at opposite sides of the opening, a removable slide mounted in the ways and adapted to cover the opening, a removable trap-door detachably journaled in the said bearings and adapted to be arranged within the body or receptacle when the same is filled with merchandise and to be mounted in the bearings after the merchandise has been removed, and means for supporting a bait above the trap-door, substantially as described.

3. A trap comprising a body or receptacle having an entrance-opening and provided at one side with a bearing-perforation, and at the opposite side with a bearing-recess having a horizontal branch, a bait-hook arranged within the body or receptacle, and a trap-door detachably journaled in the perforation and the recess and cut away to clear the bait, substantially as described.

4. A combined grocery-can and animal-trap comprising a body or receptacle adapted to contain merchandise and provided with an entrance-opening, said body or receptacle having bearings located in the plane of the bottom of the opening, ways arranged at opposite sides of the opening, a slide mounted in the ways, a trap-door detachably journaled in the bearings and adapted to be arranged at the bottom of the body or receptacle when not in use, a cover, and a strip of fabric mounted on the exterior of the body or receptacle and extending to the entrance-opening, substantially as described.

In testimony that I claim the foregoing as my own I have hereto affixed my signature in the presence of two witnesses.

HEINRICH FRIEDRICH MARIUS LAHANN.

Witnesses:
J. A. McDONNELL,
SAMUEL KERR.